April 12, 1927.
L. A. PAINE
ALTERNATING CURRENT METER
Filed Feb. 20, 1922
1,624,178
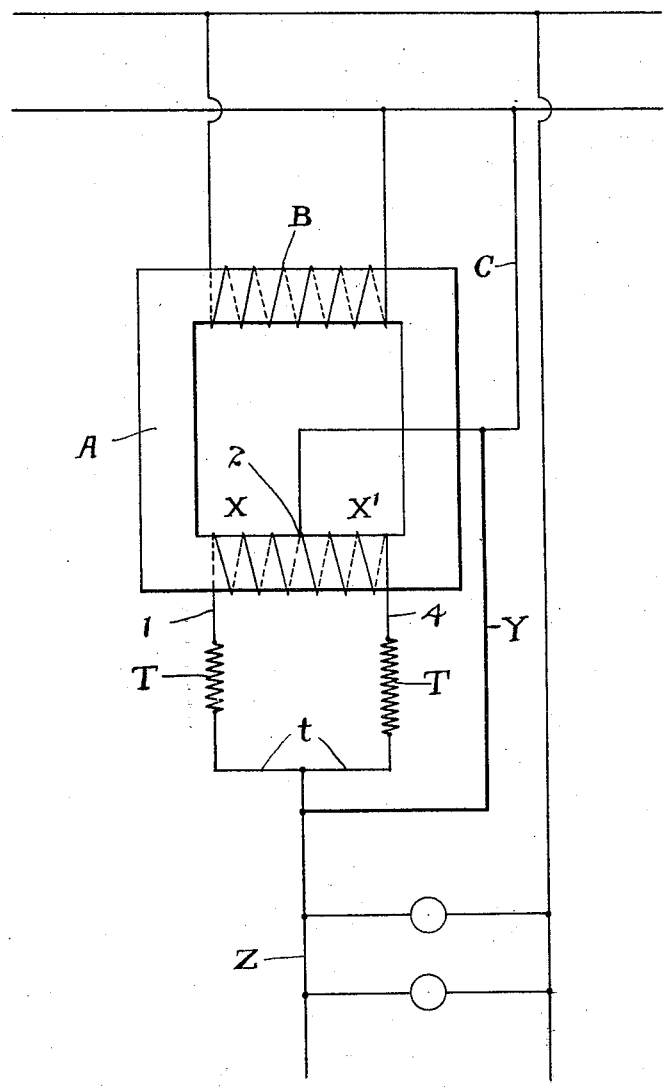
*Inventor*
Louis A. Paine Patented Apr. 12, 1927.

1,624,178

UNITED STATES PATENT OFFICE.

LOUIS A. PAINE, OF TORONTO, ONTARIO, CANADA, ASSIGNOR TO LINCOLN METER COMPANY, LIMITED, OF TORONTO, ONTARIO, CANADA.

ALTERNATING-CURRENT METER.

Application filed February 20, 1922. Serial No. 538,116.

The principal object of the invention is, to enable the variation of the capacity of a watt meter in the measurement of alternating current without the necessity of changing the current coils thereby enabling the altering of the capacity meter without the necessity of either changing the meter or the coils of same.

The principal feature of the invention consists in connecting the line current to the meter current coil at a point midway of its length to neutralize inductance and introducing a shunt wire between the line current connection to said coil and the line circuit connection from a pair of translating devices differentially connected with the ends of said coil.

The drawing is a diagram of my proposed arrangement of the shunt connection with the transformer coil of the meter.

It has been the practice in measuring alternating currents to increase the current capacity of the meter by the use of different sizes of coils and the physical proportions of the conducting circuits are figured in the meters according to the work required.

In the diagram illustrating the invention the current coil X—X' is wound upon the core of the meter transformer A and the terminal ends 1 and 4 thereof are connected to translating devices T which are preferably in the form of heaters as used in the "Lincoln" thermal watt meter which is described in United States Patent 1,156,412 of October 12, 1915. These heaters are connected by the wires t to the line current wire Z.

A line current wire C is connected to the coil X—X' at the point 2 which is midway of the length of said coil. The current flowing through the wire C flows in both directions through the sections X and X' of the current coil and through the translating devices T—T but the local circulating current induced by the potential coil B of the transformer flows through the current coil from end to end in one direction and affects the translating devices in the manner fully described in the "Lincoln" patent.

The division of the line current through the two halves of the current coil of the meter has the effect of neutralizing induction from the line current and the voltage is governed by the equation:

E=IR where
E=volts or potential drop (P. D.)
I=Current
R=resistance in ohms of coil X and X'.

A shunt Y of the desired capacity and resistance is introduced between the line current connection C and the line current connection Z which is connected midway between the translating devices T.

It will thus be readily appreciated that the character of the shunt Y may be altered to suit any desired conditions of service of the meter without requiring any change whatever in the meter coils or the translating devices and the current flow through the meter will always be in proportion to the character of the shunt.

Another important feature in connection with this arrangement is that of temperature correction. The meter coils contain a considerable quantity of metal which has a positive temperature co-efficient and the temperature co-efficient of the shunt should always be greater than that of the meter circuit to offset or equalize the fall in the conductive property of the coils.

It has been common practice to use various arrangements of shunts for purposes of calibration but as far as I am aware it is entirely novel to arrange a shunt in an A. C. meter to vary its capacity.

The illustration is a diagram of a very well known type of meter namely, the "Lincoln" thermal watt meter disclosed in the United States patent previously referred to and no claim whatsoever is made to its construction but merely to the arrangement of the shunt between the line wire connection to the current coil and the common lead from the thermal elements.

What I claim as my invention is:—

1. In an A. C. meter, the combination with the current coil of a meter transformer having a current connection midway of its length, and a pair of translating devices connected with the ends of said coil and having a common connection extending therebetween, and a shunt arranged between said current connection and said common connection between said translating devices.

2. In an A. C. meter, the combination with the current coil of a thermal watt meter a pair of heaters differentially connected therewith and connected together, said coil having a current connection mid-way of its length, of a shunt of a predetermined capacity and resistance arranged between the mid point of the current coil and a mid point between the heaters.

3. In an A. C. watt meter the combination with a thermal watt meter having a current coil and heaters connected to the ends thereof and a current lead connected mid-way of the length of said coil and a common current lead connected with the ends of said heaters remote from the current coil, of a shunt connected with said common current lead mid-way between the heaters and to said current coil mid-way of its length, said shunt having a predetermined capacity and a temperature co-efficient greater than that of the meter circuit.

LOUIS A. PAINE.